United States Patent [19]
Haces et al.

[11] Patent Number: 6,047,184
[45] Date of Patent: Apr. 4, 2000

[54] SUBSCRIBER SERVICE IN A TELECOMMUNICATION NETWORK

[75] Inventors: Lucia Suarez Haces, Stockholm, Sweden; José Pons, Aachen, Germany; Christina Birkhammar, Bromma, Sweden; Dagmar de Rooy, Macleod, Australia; Hannu Vainiomäki, Herzogenrath, Germany

[73] Assignee: Telefonaktiebolaget LM Ericsson, Stockholm, Sweden

[21] Appl. No.: 08/849,284

[22] PCT Filed: Nov. 29, 1995

[86] PCT No.: PCT/SE95/01430

§ 371 Date: May 30, 1997

§ 102(e) Date: May 30, 1997

[87] PCT Pub. No.: WO96/17488

PCT Pub. Date: Jun. 6, 1996

[30] Foreign Application Priority Data

Dec. 1, 1994 [SE] Sweden .................................. 9404174

[51] Int. Cl.⁷ ....................................................... H04Q 7/04
[52] U.S. Cl. .......................... 455/445; 455/414; 455/461; 379/201
[58] Field of Search .................................... 455/432, 433, 455/436, 445, 458, 414, 461, 417, 463; 379/88.19, 192, 196, 201, 211, 88.15, 88.25, 210, 203, 204, 212

[56] References Cited

U.S. PATENT DOCUMENTS

| | | |
|---|---|---|
| 4,873,719 | 10/1989 | Reese . |
| 5,329,578 | 7/1994 | Brennan et al. . |
| 5,481,590 | 1/1996 | Grimes ....................................... 379/57 |
| 5,559,859 | 9/1996 | Dai et al. .................................... 379/51 |
| 5,841,837 | 11/1998 | Fuller et al. ............................... 379/57 |
| 5,841,854 | 11/1998 | Schumacher et al. ................... 379/265 |

FOREIGN PATENT DOCUMENTS

| | | |
|---|---|---|
| 0 355 777A2 | 8/1989 | European Pat. Off. . |
| 0 434 239A2 | 11/1990 | European Pat. Off. . |
| 2-219834 | 9/1990 | Japan . |
| WO94/18805 | 8/1994 | Sweden . |

OTHER PUBLICATIONS

Jörgen Lantto, Intelligent Network Architecture in the Japanese Digital Cellular Standard—PDC, Ericsson Review, No. 3, 1994, 6 pages.

*Primary Examiner*—Wellington Chin
*Assistant Examiner*—Pablo Tran
*Attorney, Agent, or Firm*—Burns, Doane, Swecker & Mathis, L.L.P.

[57] ABSTRACT

The invention relates to a subscriber service implemented in a telecommunications network (301). The subscriber service is used by a called B-subscriber (MS1), wherein the B-subscriber is able to control the call connection sequence by means of the subscriber service in the event of a call request from a calling A-subscriber (A1). Two separate connections are set-up when the call request is sent from the A-subscriber to the B-subscriber. If the B-subscriber accepts the call, the connections are interconnected in a service node (303). When the B-subscriber chooses to utilize the subscriber service, the subscriber number of the A-subscriber is stored in a memory (304) and the A-subscriber is informed that the B-subscriber will call back later, whereafter the call request is terminated and the two separate connections are released. The B-subscriber is then able to call the A-subscriber with the aid of the subscriber service, while using the A-number stored in the memory (304).

15 Claims, 8 Drawing Sheets

SUBSCRIBER SERVICE IN A TELECOMMUNICATION NETWORK

TECHNICAL FIELD

The present invention relates to a subscriber service implemented in a telecommunications network that includes a mobile radio network. More specifically, the invention relates to a mobile subscriber service, a called B-subscriber, wherein the B-subscriber is able to control the set-up procedure upon receipt of a call request from a calling A-subscriber, and to a telecommunications network in which the subscriber service is implemented.

BACKGROUND ART

EP-A1-0 355 777 describes a communications apparatus, i.e. a telephone or facsimile apparatus, which includes a receiver unit that receives discriminating information for discrimination of a calling party, a memory for storing information received by the receiver unit when the calling party is unanswered, and a display unit which presents visually information stored in the memory. When the call made by the calling party is unanswered, the communications apparatus decides to store the telephone number of the calling party in the memory and displays a message on the display of the called party. This message is presented in text form on the display unit, therewith informing the called party that an attempt has been made to reach him in his absence. The called party then brings-up the stored telephone numbers onto the display unit and, if so wishing, can use the numbers to ring those persons that have attempted to reach him in his absence.

One drawback with this communications apparatus is that the called party cannot, himself, control the course of events when the calling party attempts to set-up a connection. Furthermore, a complete connection is set-up between the calling and the called parties in spite of the fact that this connection cannot be used because the called party is absent and is unable to receive the call. Another drawback is that existing telephone apparatus and facsimile apparatus must be replaced with communications apparatus that meet with the requirements of EP 0 355 777, in order to be able to utilize the function described in said patent document. Another drawback is that the communications apparatus only deals with those situations when the called party is not physically present in the vicinity of the communications apparatus. However, many situations are conceivable wherein the called party is prevented from answering the call, although being in the vicinity of his/her telephone.

Japanese Patent Application 2-219834 describes a function in a mobile communications system wherein a called mobile can allow a calling party to wait before answering the call. The user of the called mobile sends a signal informing the calling party that the call will be answered shortly and is asked to leave his/her telephone number. The telephone number is stored in a mobile telephone switching centre, whereafter the calling party is released. The calling party then waits for a reply signal from the mobile, and the mobile subsequently calls the calling party on the stored number.

One drawback with this function is that the calling party must key-in his/her telephone number himself/herself, with the subsequent risk of the wrong number being keyed-in. Another drawback is that the function is merely intended to deal with one incoming call. For instance, if the function is used when the mobile is engaged a third party attempting to call the mobile will be unsuccessful. It is necessary for the user of the mobile to answer the call from the calling party in person before he himself can make an outgoing call.

A novel and improved network architecture for cellular mobile radio systems is described in the article "Intelligent Network Architecture in the Japanese Digital Cellular Standard—PDC", published in "Ericsson Review", No. 3, 1994. The article also mentions novel types of services that will be available in the future. One example of such services mentioned in the article is the Incoming Call Selection which enables the called subscriber, the mobile B-subscriber, to either choose to receive the call or to forward the call in accordance with individually predetermined criteria. For instance, the B-subscriber can predefine those calls that shall be allowed to pass through and how calls that are not passed through shall be dealt with. The service is then used automatically for each incoming call request during the time period predefined by the B-subscriber.

SUMMARY OF THE INVENTION

The invention is intended to solve the problem as to how a mobile, hereinafter called B-subscriber, shall be able to control the call set-up procedure in response to a call request from a calling A-subscriber to the B-subscriber with the aid of a subscriber service in a telecommunications network. It shall be possible for the B-subscriber to control the call-switching procedure with the aid of the subscriber service, call-for-call with each new incoming call request.

An object of the present invention is to provide for a mobile B-subscriber a subscriber service in which the B-subscriber can refuse to accept a call request incoming from an A-subscriber.

A further object is to provide a subscriber service which can be initiated and used easily.

According to the present invention, the result of a rejected call request may be to store the A-number, i.e. the subscriber number of the A-subscriber, in the telecommunications network, and then release the A-subscriber and B-subscriber connection. However, prior to releasing the A-subscriber, a message is sent informing the A-subscriber that the B-subscriber will call-back the A-subscriber shortly. The stored A-number can then be used by the B-subscriber in a calling sequence, in which the B-subscriber is able to call up rejected A-subscribers with the aid of the stored A-numbers.

Alternatively, a rejected call request may result in the A-subscriber being rerouted to another subscriber number earlier defined by the B-subscriber.

Another alternative is to delay the call connection procedure for a short period of time, wherein the B-subscriber is afforded the possibility of preparing himself to receive the call.

Still another alternative is that the A-subscriber is connected to the B-subscriber, despite the B-subscriber choosing to reject the call request, or that the attempt by the A-subscriber to establish a call connection is unsuccessful.

Another object of the present invention is to enable the B-subscriber himself to change the total number of A-numbers that can be stored and to be able to change the subscriber number to which an A-subscriber can be rerouted, and also to be able to activate and inactivate the subscriber service.

The aforedescribed objects are achieved in a telecommunications network which also includes a mobile radio network. The mobile radio network may be a cellular mobile radio network, such as the digital GSM network for instance, although it may also be some other type of network, such as a cordless mobile radio network for companies that use mobile telecommunications within factory or office premises. The mobile radio network includes a special service node in which subscriber services can be dealt with. When the A-subscriber shall be connected to the B-subscriber, the call request is routed via the service node, wherein the B-subscriber is given access to the subscriber service and is able to control the call set-up procedure by rejecting the A-subscriber. The B-subscriber thus interacts with the telecommunications network (the service node) when using the subscriber service to obtain the desired result.

The subscriber service thus provides a called B-subscriber with a procedure that can be followed call-by-call to control a call set-up process when the B-subscriber receives a call request from a calling A-subscriber. In order to be able to utilize the method, or process, it is necessary for the B-subscriber to be registered as a user of subscriber services in the service node. Such registration can be achieved by the B-subscriber taking out a subscription with the telephone operator concerned. Registration is made, inter alia, in a so-called home location register forming a part of the mobile radio network. Thus, when a request for routing information is sent to the home location register, it will be answered with information which results in the call request being routed to the service node. Different data concerning the B-subscriber is registered in the service node, for instance information as to the services available to the B-subscriber.

According to the present invention, the subscriber service may be configured so that it must be activated in order to be used. In this case, the B-subscriber activates the service by sending service activation information to the service node from his mobile. Receipt of the activation information in the service node enables the B-subscriber to initiate the service and control the call set-up procedure at any time whatsoever.

The inventive method includes setting-up a first connection from the A-subscriber to a gateway mobile switching centre when the A-subscriber has generated a call request to the B-subscriber. The B-number, i.e. the subscriber number of the B-subscriber, dialled by the A-subscriber is received in the gateway mobile switching centre, wherein the next step in the procedure is to collect routing information from the home location register informing of the whereabouts of the B-subscriber in the mobile radio network. Because the B-subscriber is registered in the home location register as a user of subscriber services in the service node, the routing information will result in continued establishment of the first connection from the gateway mobile switching centre to the service node. If the B-subscriber has activated the service in the manner described above, there is stored in a subscriber service means an instruction for the subscriber service to be carried out, thereby making the service available for use. In order to locate the B-subscriber, routing information is again collected from the home location register, wherein a second connection is established from the service node to the B-subscriber via the mobile radio network. When the B-subscriber "lifts his receiver", i.e. acknowledges the call request by pressing a button on the mobile telephone, he has a certain amount of time in which the service can be initiated. The subscriber service is initiated from the moment that the B-subscriber sends information from the mobile to the service node, wherein the B-subscriber is able to control the continued switching of the call request in accordance with the information that has been keyed-in. Preferably, the service is initiated by the B-subscriber pressing one (anyone) of the buttons on the mobile telephone. This enables the B-subscriber to initiate the subscriber service very quickly and easily.

The advantages afforded by the present invention reside in the ability of the B-subscriber to control the call-switching procedure himself. The B-subscriber is able to decide whether or not to accept the call request at the same time as the call request is received. The B-subscriber may always have his telephone switched on and the subscriber service can also be utilized in those circumstances when the B-subscriber is unable to answer incoming calls. The B-subscriber is able to control the call-switching sequence call-by-call, i.e. the B-subscriber is able to control the connection of each new incoming call request. The A-number of a rejected A-subscriber can be stored, wherein the B-subscriber is able to use the stored A-numbers on a later occasion and to order calling of the A-subscribers with the aid of the subscriber service, if so desired. Alternatively, the call-switching sequence can be halted briefly, so that the B-subscriber has time to prepare himself to receive the call. Another advantage is that the inventive service is implemented in the telecommunications network, wherein mobile telephone users obtain access to the service without needing to replace their old mobile telephones. Because the subscriber service can be initiated quickly and simply, the additional advantages are afforded whereby the B-subscriber is able to interrupt the ringing tone directly should the telephone ring at an inappropriate time, and is able to "save the call" until later on. Still another advantage is that the number of successful call attempts increases when applying the invention, i.e. the attempt to make a call results in an active procedure despite the fact that the B-subscriber is unable himself to answer the call request from the A-subscriber, wherein the telephone operator is able to bill the subscriber despite the fact that the call request has not been answered by the B-subscriber.

The invention will now be described in more detail with reference to exemplifying embodiments thereof and also with reference to the accompanying drawings.

DESCRIPTION OF EMBODIMENTS AT PRESENT PREFERRED

The invention thus relates to a subscriber service for a mobile B-subscriber, wherein the call-switching or call-setup procedure in response to a call request from a calling A-subscriber can be controlled with the aid of the subscriber service.

Figure 1A:
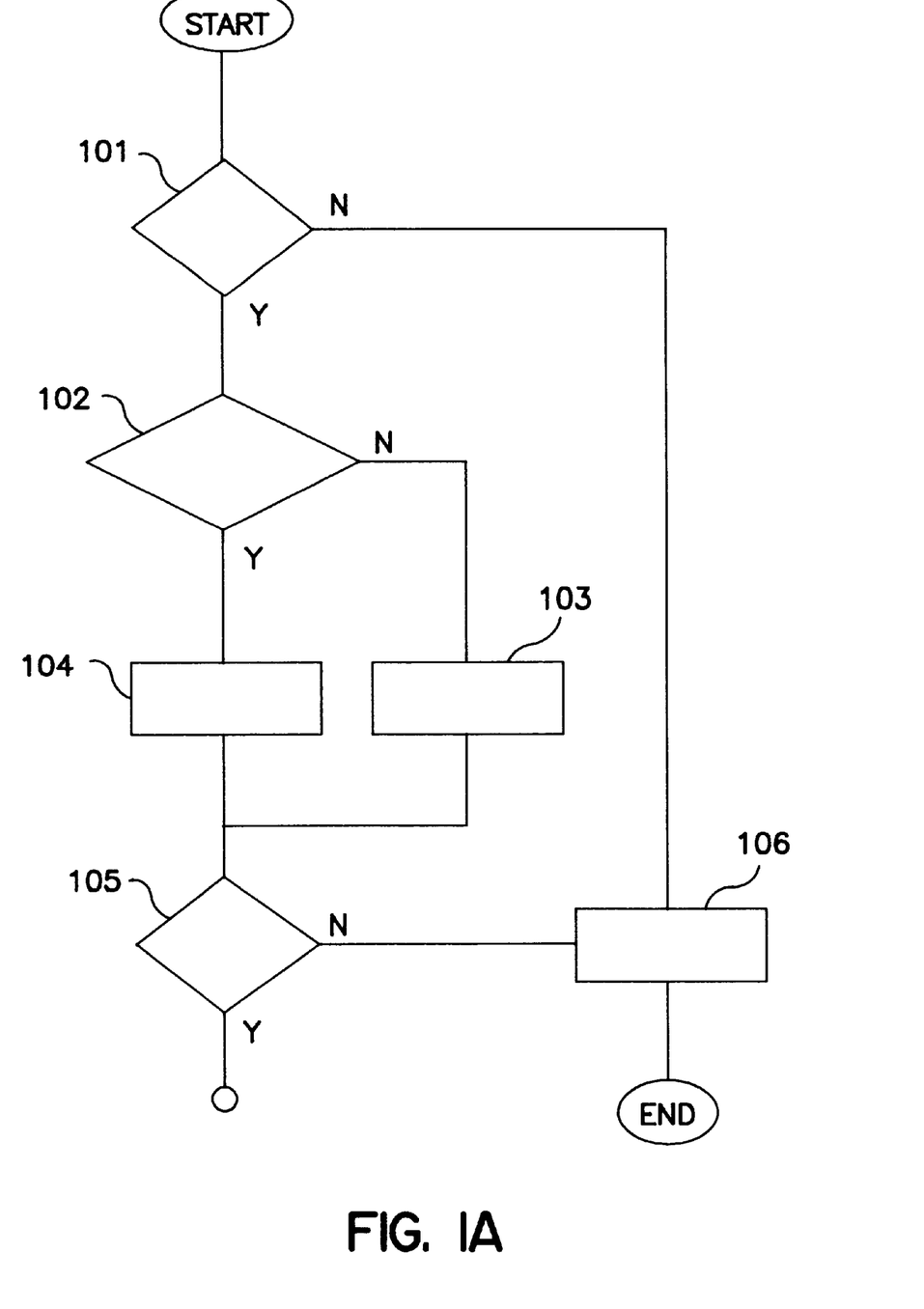
FIG. 1 is a flow sheet illustrating the subscriber service on the occasion of a call request incoming from an A-subscriber to the B-subscriber.
Figure 1B:
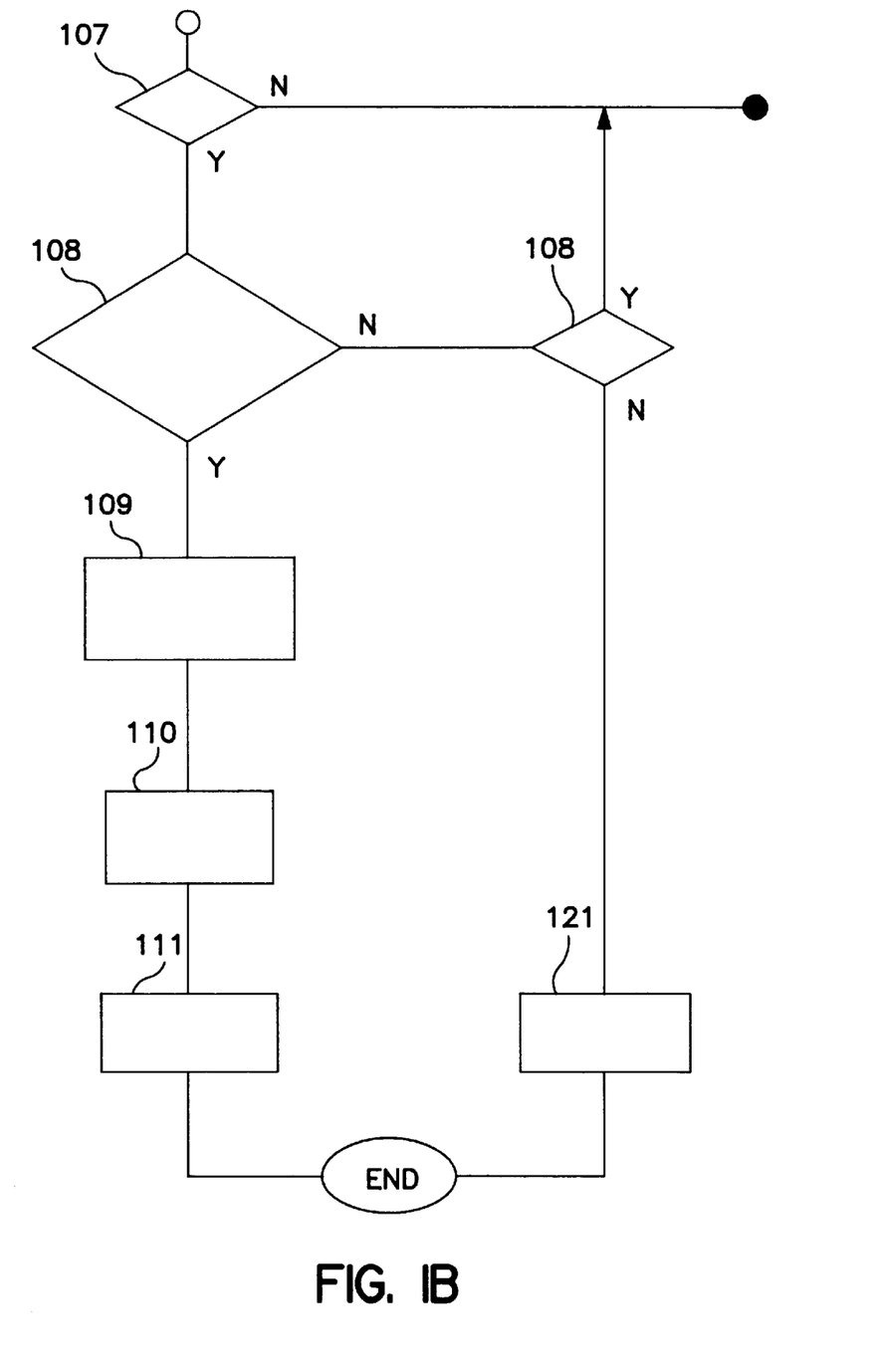
Figure 1C:
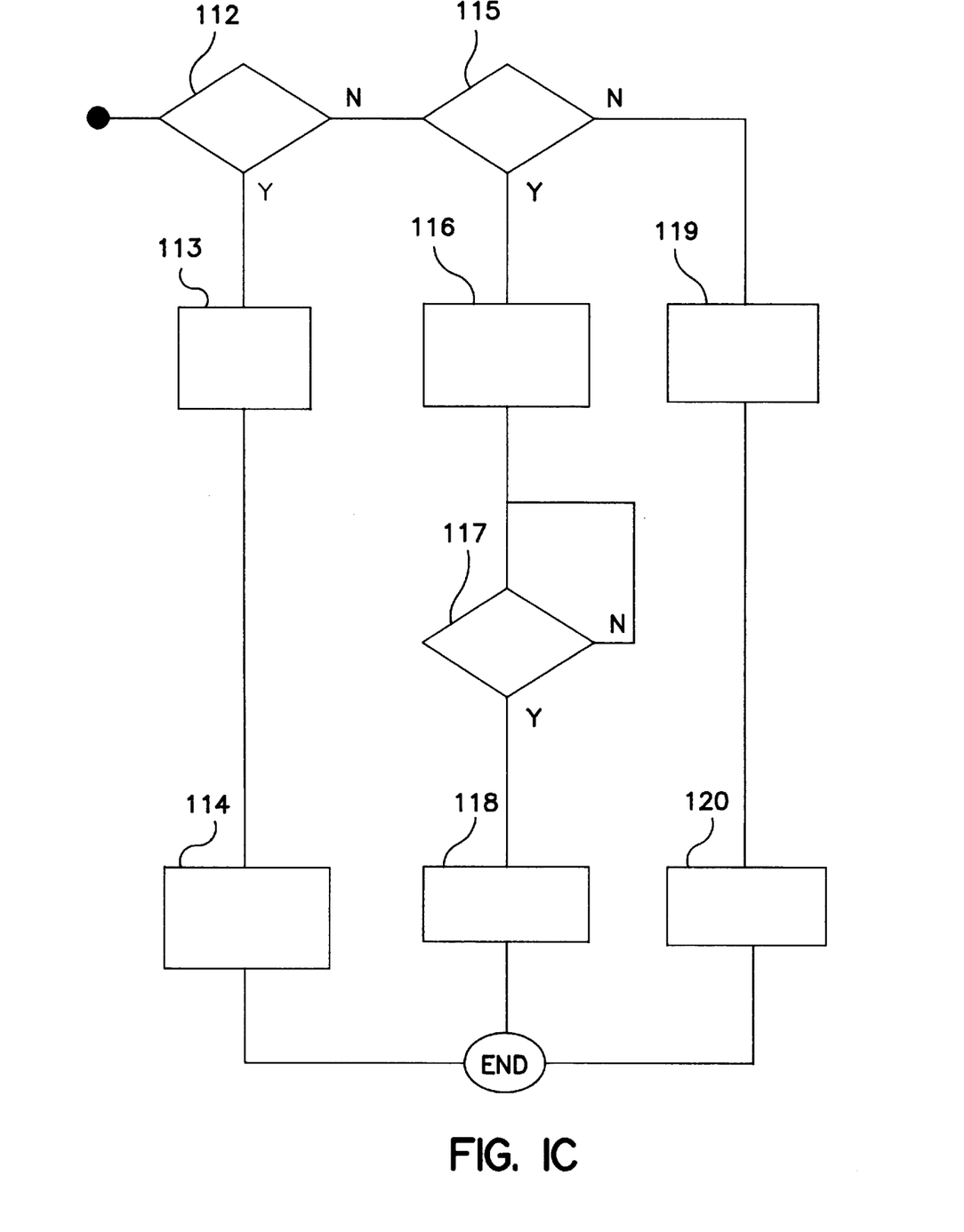

FIG. 1 is a flowsheet illustrating the procedures that can be carried out with the aid of the subscriber service in response to a call request incoming from the A-subscriber to the B-subscriber. When the A-subscriber rings the B-subscriber, a check is made in step 101 as to whether the B-subscriber has activated the service or not. The service cannot be used if it has not been activated, in which case the call request is connected in a conventional manner in step 106. If the service has been activated, a check is made in step 102 to ascertain whether or not the A-number has been transferred, i.e. whether or not the A-number is included in the call request. The A-number must be transferred in order for the B-subscriber to be able to store the number should he choose to reject the call in accordance with the following description. If the A-number has not been transferred, the B-subscriber will be informed to this effect in step 103, e.g. a given signal tone will be played back when the B-subscriber lifts the telephone receiver in order to answer the call. If the A-number has been transferred, the B-subscriber is informed to this effect in step 104, e.g. by playing a service tone when the B-subscriber lifts the telephone receiver in order to answer the call. The B-subscriber can also be informed as to whether or not the A-number has been transferred optically, for instance with the aid of a symbol in a character display. A check as to whether or not the B-subscriber has initiated the service is then made in step 105, over a time period of, e.g., three seconds from the time of the B-subscriber lifting his receiver. If the B-subscriber has not initiated the service, the call request from the A-subscriber will be dealt with conventionally, wherein a call connection is set up between the A-subscriber and the B-subscriber in step 106. If the B-subscriber initiates the service in step 105, this will enable the B-subscriber to control continued handling of the call request. This control may consist in rejection of the call request by the B-subscriber, wherein a number of different procedures can be used to reject the call.

One method of rejecting the call request is to store the A-number, whereupon the call connection is terminated. The B-subscriber can then call the A-subscriber with the aid of the stored number at a time suitable to the B-subscriber. In order to be able to store the A-number, it is necessary for the number to be transferred with the call request. Thus, a check is made in step 107 as to whether initiation of the service means that the A-number shall be stored. If the answer is positive, a check is made in 108 as to whether or not a memory has sufficient space to store the A-number and whether or not the A-number has been transferred. The memory space is limited, because unlimited memory space would make handling of the subscriber service too difficult. For instance, the memory may be designed to store at most thirty-two calls. A memory of such large storage capacity is hardly necessary in practice, since the B-subscriber will preferably call the A-subscriber as quickly as possible when the opportunity presents itself, whereafter the A-number can be erased from the memory. If insufficient space is found in the memory, or if the A-number has not been transferred, one of the other methods of rejecting the call request must be used, as described below. If sufficient memory space is available and if the A-number has been transferred, the A-subscriber is informed in step 109 that the B-subscriber has rejected his call request and that the B-subscriber will call the A-subscriber later on. This message can be delivered by means of a speech answering machine. The A-number is then stored in the memory in step 110. The A-subscriber is then released from the B-subscriber in step 111.

Another method of rejecting the call request is for the B-subscriber to redirect the request to a subscriber number earlier defined by the B-subscriber. If the answer is negative in step 107 ("Shall the A-number be stored?"), a check is made in step 112 to ascertain whether or not the call request shall be rerouted. If the call is to be rerouted, the A-subscriber is informed to this effect in step 113, whereafter a call connection to the number defined by the B-subscriber is established in 114.

Another method of rejecting the call request is to delay handling of the request temporarily. This delay can be utilized by the B-subscriber when he needs a short space of time in which to prepare himself for receiving the call. If the reply in step 112 ("Rerouting?") is negative, a check is made in step 115 to ascertain whether or not processing of the call request can be delayed. If the call can be delayed, the A-subscriber is informed in step 116 that the B-subscriber will answer the call shortly. In step 117, there is awaited a signal which indicates that processing of the call request can be resumed. This signal can either be produced after a given length of time has lapsed, or can be produced by the B-subscriber when he is ready to receive the call. In response to the signal generated by the B-subscriber, a call connection is established in step 118 in a conventional manner. When the signal is generated automatically by the system after said time period has lapsed, continued handling of the call request can be effected in accordance with one of the alternatives described, for instance the A-number can be stored. If the answer in step 115 ("Shall the connection be delayed?"), the A-subscriber can be informed in step 119 that the B-subscriber cannot be reached at that time, whereafter the call request is broken off and established connections are released in step 120.

As mentioned above, the call request must be rejected in some other way if the A-number cannot be stored due to the lack of available memory space, or because the A-number has not been transferred, i.e. because of a negative response to one of the questions in step 108. In this case, the call request can instead be rerouted in accordance with steps 112–114, handling of the call request delayed in accordance with steps 115–118, or the call request can be broken off in accordance with steps 119–120, i.e. in accordance with an alternative J in step 108a. A further possibility, according to an alternative N in step 108a, is to connect the A-subscriber to the B-subscriber in step 121 when no memory space is available or when the A-number has not been transferred. Which of these alternatives is used can be determined either by the B-subscriber when keying-in control information in response to questions from an automatic speech answering machine, for instance, when the service is activated, or determined by the B-subscriber when the B-subscriber registers as a user of the subscriber service.

In the aforegoing, the possibilities afforded by the service in the event of a call request from the A-subscriber to the B-subscriber have been described with reference to FIG. 1.

Figure 2A:
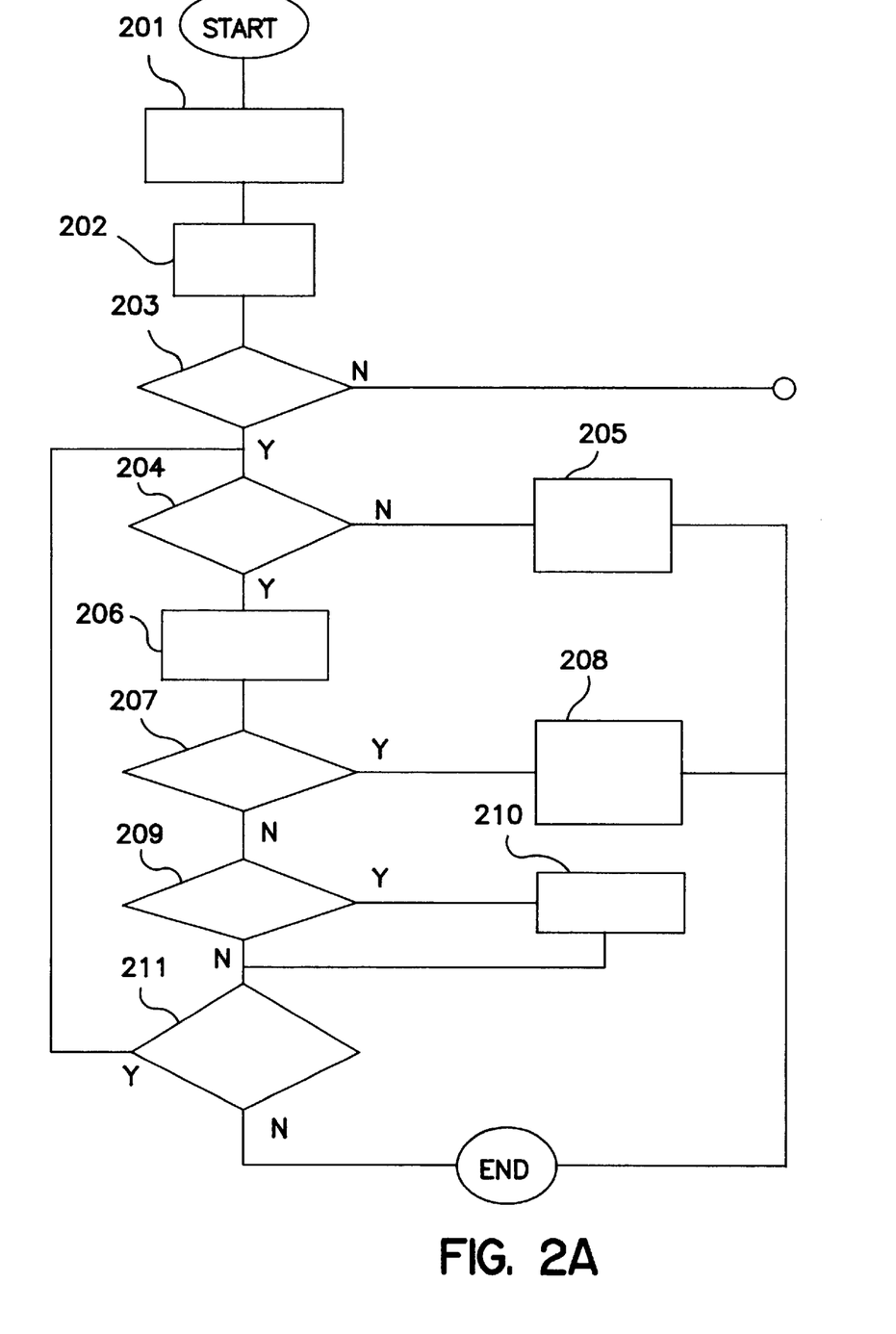
FIG. 2 is a flow sheet illustrating the subscriber service partly with regard to outgoing calls from the B-subscriber to an A-subscriber earlier rejected by the B-subscriber, and with regard to setting the total number of A-numbers that can be stored in a memory and inserting the number to which an A-subscriber can be re-routed, and partly with regard to activation and inactivation of the subscriber service.
Figure 2B:
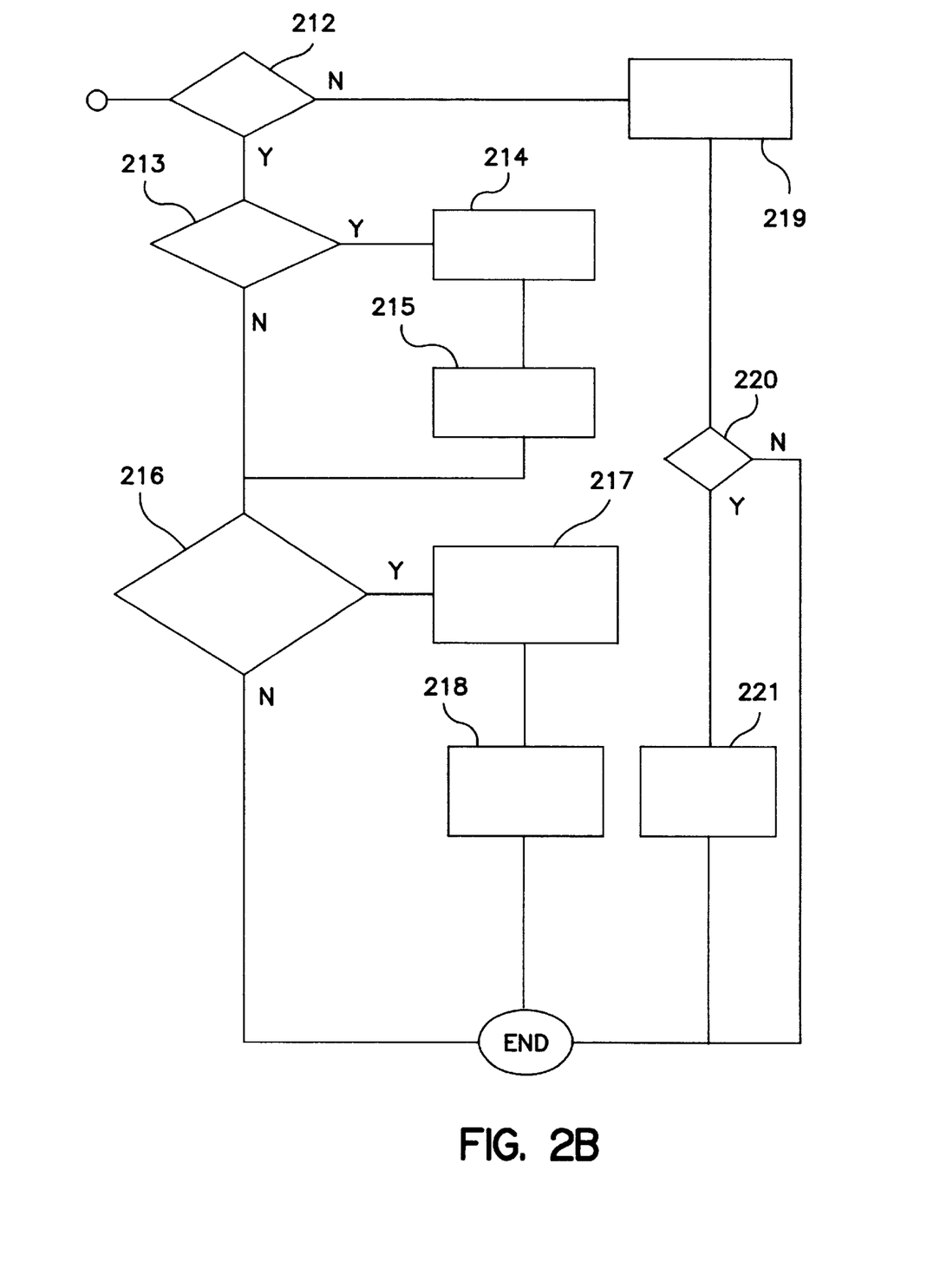

FIG. 2 is a flow sheet which illustrates how an earlier called B-subscriber can use the service to call up an earlier rejected A-subscriber, when the number of the A-subscriber has been stored on the occasion of the rejection. It will be noted that the subscriber using the service is also called the "B-subscriber" in the following, even though he uses the service to call the rejected A-subscriber. In addition to the calling function, FIG. 2 also illustrates a setting function which enables the B-subscriber to set the total number of A-numbers that can be stored in the memory, and also the subscriber number to which the A-subscriber can be redirected, and also an activation function which enables the B-subscriber to change the status of the service, i.e. to activate an inactivated service and vice versa.

The B-subscriber initiates the service in step 201, by keying-in a service code. In step 202, a speech answering machine asks the B-subscriber whether he intends to use the calling function, the setting function or the activation function. The response of the B-subscriber to these questions is checked in step 203, and if the answer is "Call up", a check is made in step 204 to ascertain whether or not numbers are stored in the memory. If no A-numbers are stored in the memory, the B-subscriber is informed to this effect in step 205, whereafter the service is terminated. If one or more A-numbers are found stored in the memory, one number at a time according to a listed order is presented to the B-subscriber. Thus, the first number is presented to the B-subscriber in step 206 and the B-subscriber is also asked in step 206 whether or not he wishes to establish a call connection with the number presented, or if the number shall be erased from the memory, or if the service shall be terminated. If the B-subscriber response is for a call connection to be set-up, the connection to the A-subscriber is established in step 208. The service is then terminated upon termination of the call to the A-subscriber. If the B-subscriber response in step 207 is negative, the subscriber is asked in step 209 whether the presented number shall be erased from the memory. If the B-subscriber response is positive, the A-number is erased in step 210. If the number is not to be erased, it will instead be stored last in the order of numbers in the memory 304. The handling sequence then continues with step 211, in which the B-subscriber is asked whether or not the next number in the list shall be presented. If the B-subscriber responds positively to this question, a hop is made back to step 204, whereby the next number in the listed order is presented to the B-subscriber. According to one preferred embodiment, the B-subscriber can have the stored numbers presented two times before the service is terminated, wherein on the first presentation occasion, the B-subscriber need only check those numbers that have been stored and then choose the number which he wishes to call first on the occasion of the second presentation. If the B-subscriber does not wish to have more numbers presented, the service is terminated after step 211.

When the response in step 203 ("Call up?") is negative, the B-subscriber is asked in step 212 whether he wishes to change the setup of certain parameter values. If the answer is in the positive, a check is made in step 213 as to whether the B-subscriber wishes to change the total number of A-numbers that can be stored in the memory. If the B-subscriber's response to the question in step 213 is positive, he is asked in step 214 to key-in the new total number of calls that can be stored. A message can be left in step 215, wherein the B-subscriber is informed of the change that has been made. The B-subscriber is then asked in step 216 whether or not he wishes to change the rerouting number, i.e. the number to which the A-subscriber shall be redirected when the B-subscriber rejects a call request, this rerouting being effected in the aforedescribed manner. If the reply to the question in step 216 is in the affirmative, the B-subscriber is asked in step 217 to key-in the new rerouting number. A message can be left in step 218, wherein the B-subscriber is informed that the change has been made, whereafter the service is terminated. The service is terminated immediately when the response is negative in step 216.

If a negative response is made in step 212 ("Change the setups?"), the B-subscriber is informed of the status of the service in step 219, i.e. whether the service is activated or inactivated, whereafter the B-subscriber is asked whether the status of the service shall be changed. The answer is checked in step 220, and if the answer is in the affirmative the status is changed to an active or an inactive status in step 221, depending on whether the status was earlier inactive or active respectively, whereafter the service is then terminated. The service is terminated directly after step 220 when the response is negative.

Figure 3:
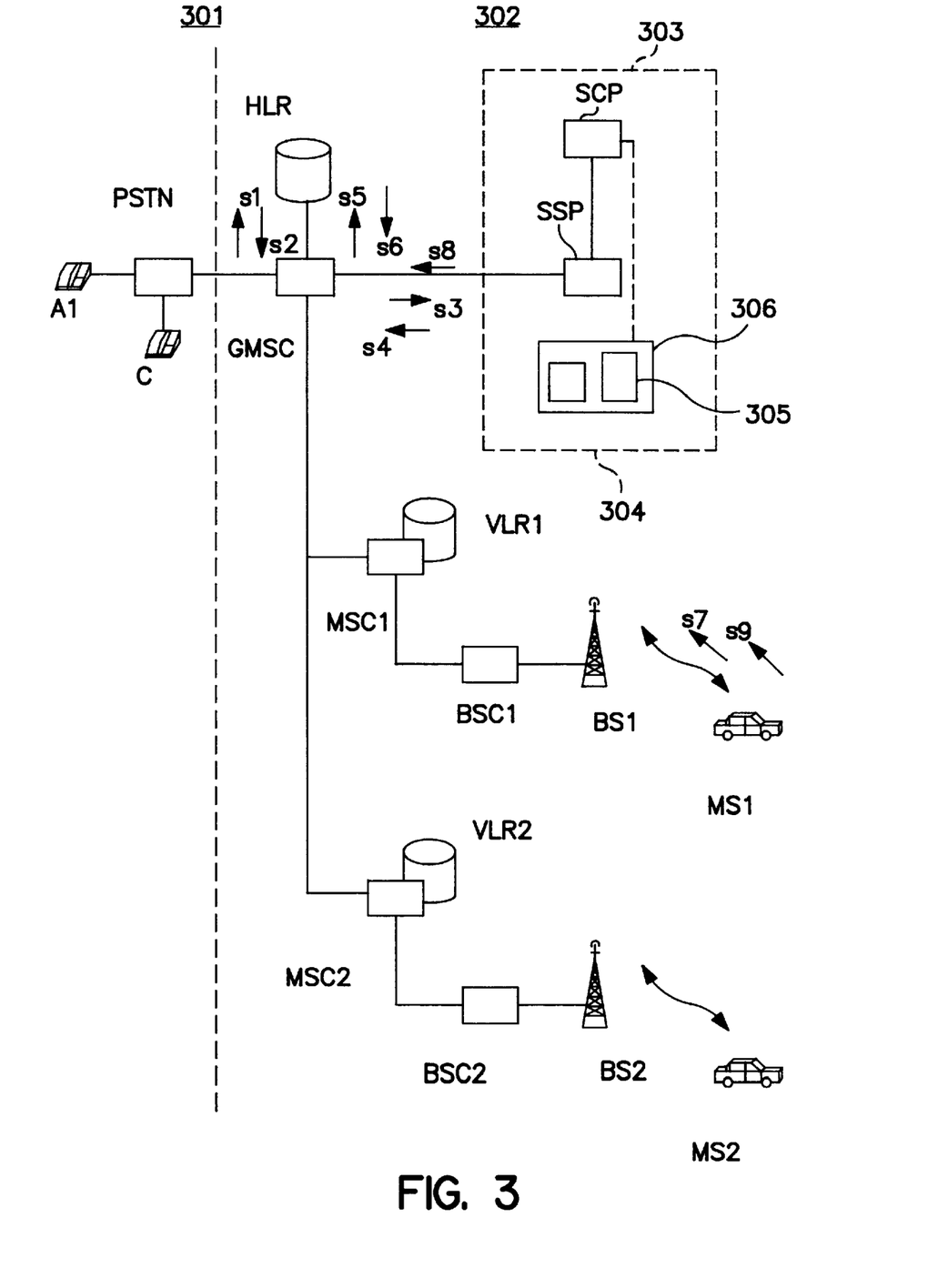
FIG. 3 illustrates a telecommunications network in which the subscriber service is implemented, and also illustrates handling of a call request from the A-subscriber to the B-subscriber.

FIG. 3 illustrates how the subscriber service according to the invention is implemented in a telecommunications network in the event of a call request from the A-subscriber to the B-subscriber. FIG. 3 also shows signals s1–s9 which occur when setting-up the call request. The signalling is also shown separately in FIG. 5. The telecommunications network 301 includes a fixed public switched telephone network PSTN and a cellular mobile radio network 302. The mobile radio network is composed of one (or more) gateway mobile switching centres GMSC, to which the call request is directed when concerning a call to a mobile B-subscriber. The gateway mobile switching centre GMSC is connected to a home location register HLR, in which information concerning the mobile subscribers is stored. Among other things, this information includes the subscriber services that are available to the B-subscriber, as described in more detail herebelow. The gateway mobile switching centre GMSC is also connected to a plurality of mobile services switching centres MSC1, MSC2, which in turn are connected to base stations BS1, BS2. A radio connection to a mobile MS1 and MS2 is established between a base station BS1 or a base station BS2 and the respective mobile MS1 or MS2. The mobile radio network also includes visitor location registers VLR1, VLR2 and base station controllers BSC1, BSC2 belonging to the respective mobile switching centres MSC1 and MSC2, as well known to the person skilled in this art According to the invention, the mobile radio network also includes a service node 303. In the event of a call request incoming to a mobile B-subscriber, the service node is connected to the gateway mobile switching center GMSC when the B-subscriber is a user of subscriber services in the service node. The service node includes a service switching unit SSP, a control unit SCP and hardware and software for different subscriber services. The service described with reference to FIGS. 1 and 2 and referenced NN is an example of one such service. In FIG. 3, hardware and software for the service NN are implemented in subscriber service means 306. The hardware for the service NN includes a memory 304, in which A-numbers are stored when the B-subscriber chooses to reject the call request by storing the A-number, as described below. The software for the service NN includes a service instruction 305 which contains control information that is executed by the control unit SCP when using the service NN.

In order for the service NN to be used, it is necessary for the B-subscriber to register in the home location register HLR as a user of services found in the special service node 303. This registration may be effected, for instance, when the B-subscriber signs a subscription with the system operator or on a later occasion when the B-subscriber signs a special subscription for using the service NN. When the service NN includes an activation function, it is also necessary for the B-subscriber to activate the service in order to be able to use said service. Activation and inactivation of this service is thus effected with the aid of said activation function, as explained in more detail below. Alternatively, the service may be implemented so that it is constantly activated and thus always ready for use. In the following example of a call request from an A-subscriber to a B-subscriber, it is assumed that the B-subscriber is registered in the home location register HLR as a user with access to services in the service node and that the B-subscriber has activated the service NN.

The setup of a call request is initiated by the A-subscriber A1 dialling the number of the mobile MS1 (the B-subscriber number), wherein a first connection is set-up from the A-subscriber to the gateway mobile switching centre GMSC in the mobile radio network, via the fixed network PSTN. The gateway mobile switching centre receives and analyzes the B-number, and asks for routing information from the home location register HLR, by sending a signal s1 to said register. As before mentioned, the B-subscriber is recorded in the home location register as a user of services available in the service node 303, which means that calls to (and from) the B-subscriber shall be set up via the service node. Consequently, the home location register HLR answers with information, signal s2, which results in continued connection, signal s3, of the first connection from the gateway mobile switching centre GMSC to the service node 303. The switching unit SSP in the service node receives the signal s3 and informs the control unit SCP to this effect. In response, the control unit orders the switching unit to enable the services activated by the B-subscriber. Thus, the service instruction 305 and the memory 304 for the activated service according to the invention are enabled for initiation, when the B-subscriber chooses to use the service. The control unit then orders the switching unit to set-up a second connection which is separate from the first connection, from the service node to the gateway mobile switching centre GMSC. The switching unit is then ordered to send a signal s4 to the gateway mobile switching centre, wherein said centre GMSC is again ordered to collect routing information from the home location register HLR, by sending a signal s5 to said home location register. The home location register now responds with information, a signal s6, which includes a so-called routing number DNR (mobile station roaming number—MSRN) which discloses where in the mobile radio network the B-subscriber is located. This information is updated as the B-subscriber moves within the area covered by the mobile radio network and is obtained from the relevant visitor location register VLR. With the aid of routing information in the signal s6, the setup of said second connection between the service node 303 and the gateway mobile switching centre GMSC is continued to the B-subscriber MS1 via the mobile services switching centre MSC1, the base station controller BSC1 and the base station BS1 which according to the routing number DNR shall be used to reach the B-subscriber. Signalling occurring in this continued establishment of the second connection is effected in accordance with known techniques and will not therefore be described in more detail in this context. The reader is referred to Ericsson's "CME 20 System Survey", Chapter 7, page 25, for a more detailed description of this signalling procedure. Ring signals are then sent to the B-subscriber. The B-subscriber MS1 is now able to decide whether he wishes to control the continued setup of the call request. As the B-subscriber lifts the receiver, a signal s7 is sent from the mobile MS1 to the switching unit SSP, which informs the control unit SCP. The control unit in the service node 303 orders the switching unit to send the aforesaid tone signals (FIG. 1, step 103 or step 104) which can be heard by the B-subscriber in the telephone receiver when he lifts the receiver (the signal s8). The switching unit is also ordered to monitor a time period within which the B-subscriber is able to initiate the service. This time period may have a duration of three seconds, for instance. If the B-subscriber fails to initiate the service (FIG. 1, step 105) within the set time period, the first connection between the A-subscriber and the switching unit SSP in the service node and said second connection between the switching unit and the B-subscriber will be joined up, therewith establishing a call connection in a conventional manner. When the B-subscriber initiates the service, a signal s9 is sent to the switching unit SSP and the control unit will reject the call request in accordance with the control information in the service instruction 305, as illustrated for instance in FIG. 1, steps 108–111. Initiation is preferably effected by the B-subscriber depressing one of the buttons on the keypad of the mobile MS1 within said time period, therewith producing the signal s9.

As mentioned above, a rejection of a call request by the B-subscriber may result in storage of the A-number, rerouting of the A-subscriber, a delay in establishing a call connection, the release of a connection or the establishment of a call connection despite the B-subscriber having chosen to reject the call request (FIG. 1, steps 107, 112, 115, 119 or 121). When the memory 304 is full or when the A-number has not been transferred, redirection of the A-subscriber, or a delay in setting up a call connection, or releasing of a call connection are the alternatives most preferred. The ways in which a call request can be rejected are determined by control information in the service instruction 305. The control information can thus be implemented in several ways. According to one alternative, the control information may require the B-subscriber to key-in all requisite rejection information when initiating the service, by pressing one or more buttons or keys on the keypad of the mobile MS1. According to another alternative, it may be necessary to depress only one button (any button whatsoever) in order to initiate the service, wherein additional information is then keyed-in as to how the call request shall be rejected in response to questions from the service instruction 305, these questions being asked by a speech answering machine controlled by the control unit SCP. According to a third alternative, initiation can be effected by depressing a button which will result in storage of the A-number, wherein the other methods of rejection are employed only when the memory 304 is full or when the A-number has not been transferred.

When the B-subscriber wishes to store the A-number (FIG. 1, step 107), the B-subscriber keys-in information to this effect and the signal s9 is sent from the mobile MS1 to the switching unit SSP, which informs the control unit. The control unit checks that the memory 304 has available storage space and that the A-number has been transferred. If such is not the case, the call request is rerouted in accordance with FIG. 1 for instance, steps 112–114. If the memory has available storage space and the A-number has been transferred, the switching unit is ordered to send to the A-subscriber, via said first connection, a speech response message found in the service instruction 305, wherein the A-subscriber is informed that the B-subscriber will call later (step 109). The switching unit is then ordered to store the A-number in the memory 304 (step 110). The connection to the A-subscriber is released after the message has been played, or when the A-subscriber replaces his receiver. The connection to the B-subscriber is released after he has initiated storage of the A-number.

When the control information in the service instruction 305 allows the B-subscriber to reroute the call request to another subscriber number C, steps 113–114 in FIG. 1, the control unit SCP will order continued connection of the first connection to the second subscriber number when the B-subscriber orders rerouting, and the call is answered by a subscriber C. The call request can also be rerouted to a voice mailbox into which the A-subscriber can speak a message.

The second connection to the B-subscriber is released when rerouting is initiated.

When the control information in the service instruction 305 allows the B-subscriber to delay handling of a call request, steps 116–118 in FIG. 1, the control unit SCP will order the switching unit SSP to send to send a speech response message to the A-subscriber when the B-subscriber orders a delay, wherein the A-subscriber is informed that the B-subscriber will answer the call request shortly. The switching unit then awaits a callback signal generated by either the B-subscriber or by the service node after a predetermined time, ordering the switching unit to interconnect the first connection and the second connection, thereby establishing a call connection between the subscribers A1 and MS1.

When the control information in the service instruction 305 allows the B-subscriber to release the call request, steps 119–120 in FIG. 1, the control unit SCP will order the switching unit to send a speech response message to the A-subscriber informing said subscriber that the B-subscriber is unable to accept his call at the moment when the B-subscriber orders a call release. The connection to the A-subscriber is then released. The B-subscriber is released after having initiated release of the A-subscriber.

It has been assumed in the above exemplifying embodiment that the calling subscriber is a subscriber A1 connected to the public switched telephone network PSTN. However, according to the invention, the A-subscriber may also be a mobile subscriber A2. In the event of a call request from the A-subscriber A2, a first connection is established in a known manner from the A-subscriber A2 to the gateway mobile switching centre GMSC, via the base station BS2, the base station controller BSC2 and the mobile switching center MSC2. Continued handling of the call request is then effected in the manner described above.

Figure 4:
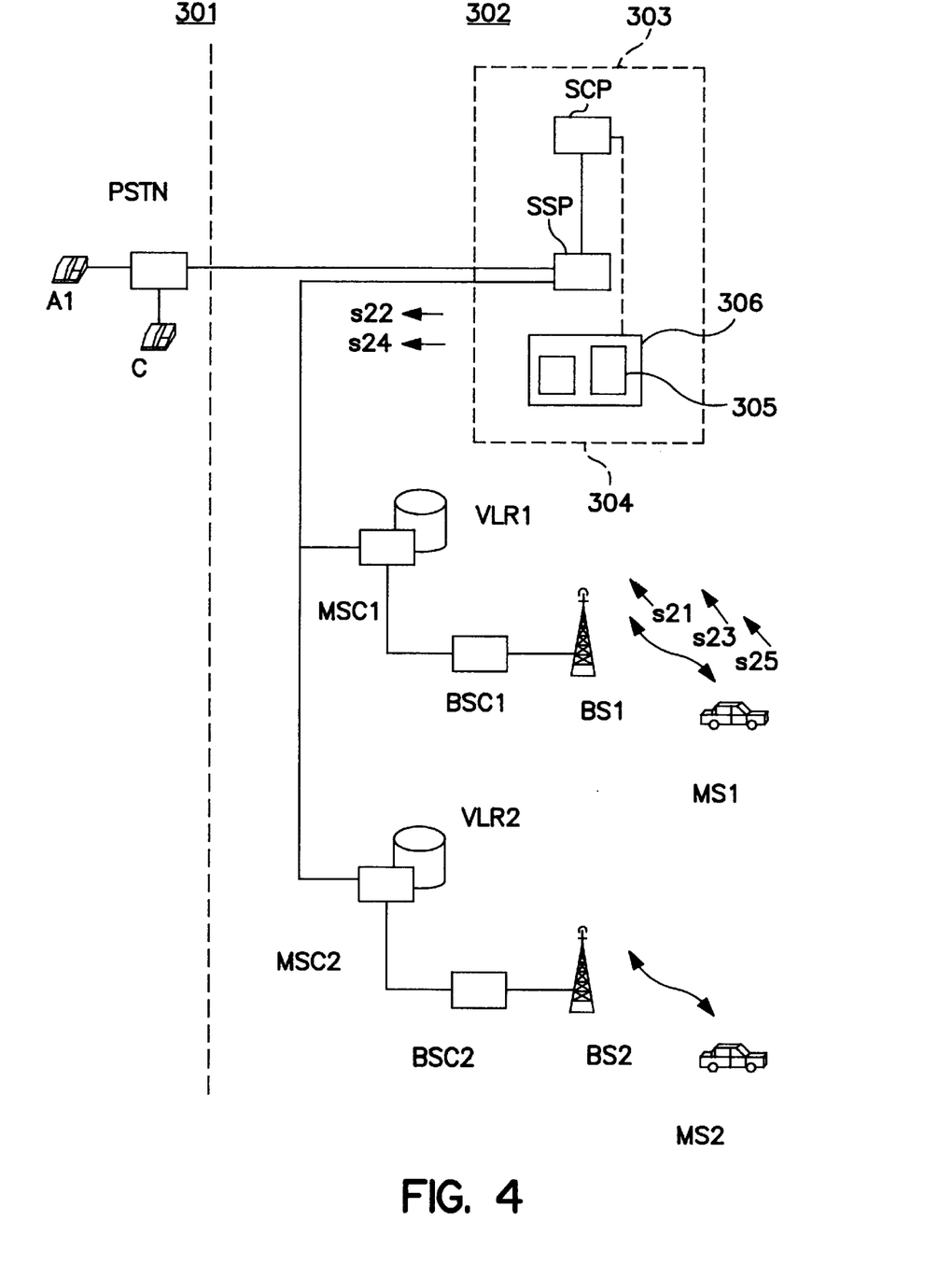
FIG. 4 illustrates the telecommunications network in FIG. 3 and also illustrates the procedure when an A-subscriber earlier rejected by the B-subscriber is called back.

FIG. 4 illustrates how the B-subscriber can use the service to make outgoing calls (the call-up function) when A-numbers are stored in the memory 304. Also described below is how the B-subscriber can set up parameter values (the setup function) or activate/inactivate the service (the activation function). The B-subscriber initiates the service by keying-in a special service code from its terminal MS1, a signal s21, this code being identified in the mobile services switching centre MSC1, step 201 in FIG. 2. As a result of this identification of the service code, the signal s21 is sent further to the switching unit SSP in the service node 303. The switching unit receives the signal s21 and asks the control unit SCP for instructions. The control unit orders the switching unit to send to the B-subscriber a question, signal s22, stored in the service instruction 305 as to whether either the call-up function, the setup function or the activation function shall be used (step 202). The desired function is then performed in accordance with the information sent to the service node by the B-subscriber in a signal s23.

When the B-subscriber chooses the call-up function (dialling function) through the means of signal s23, step 203 in FIG. 2, the control unit checks whether or not numbers are stored in the memory 304. If such is not the case, the control unit orders the switching unit to send to the B-subscriber a message to the effect that no numbers are stored in the memory, whereafter the control unit terminates the service. When numbers are stored in the memory, the control unit orders the switching unit to send a message, signal s24, which presents a stored number to the B-subscriber (step 206). This presentation is effected with the aid of a speech response machine, although it can also be presented on a display with which the mobile telephone of the B-subscriber is equipped. The B-subscriber is also ordered to key-in information as to whether he wishes to be either connected to the number, to erase the number from the memory or to see the next number stored in the memory. The B-subscriber keys-in information, signal s25, which is sent to the service node and interpreted by the control unit SCP, wherein a call connection is established from the service node to the presented number when the B-subscriber elects to be connected with said number. The service is then terminated. If the B-subscriber, in accordance with signal s25, chooses to erase the number, the number is erased by the switching unit on the order of the control unit. If the number is not to be erased from the memory, the number is placed last in the listed order in the memory 304. The B-subscriber is then presented with the next number in the memory or the service is terminated, in accordance with the information supplied by the B-subscriber in the signal s25. If the next number is to be presented, the above procedure is repeated (from step 204).

When the B-subscriber selects the setup function, step 212 in FIG. 2, the control unit SCP orders the switching unit SSP to enquire of the B-subscriber whether he wishes to change the number of A-numbers that can be stored in the memory 304, whether the B-subscriber wishes to change the rerouting number, or whether the B-subscriber wishes to change both parameters. In response to the information sent by the B-subscriber to the service node, the service node then sends a message in which the B-subscriber is informed of current settings of the total number of A-numbers that can be stored and/or the rerouting number and is ordered to enter these new values. After the new values or settings have been received in the service node, the service node sends to the B-subscriber a message confirming receipt of said new values, whereafter the service is terminated.

If the B-subscriber chooses the activation function, step 219 in FIG. 2, the B-subscriber is offered the possibility of activating or inactivating the service (NN). The control unit SCP orders the switching unit to send a message to the B-subscriber wherein the B-subscriber is informed of the current status of the service (active or inactive). The message also contains a query as to whether the status shall be changed or not. The status of the control unit is maintained or changed in response to the answer given by the B-subscriber, whereafter the service is terminated.

Figure 5:
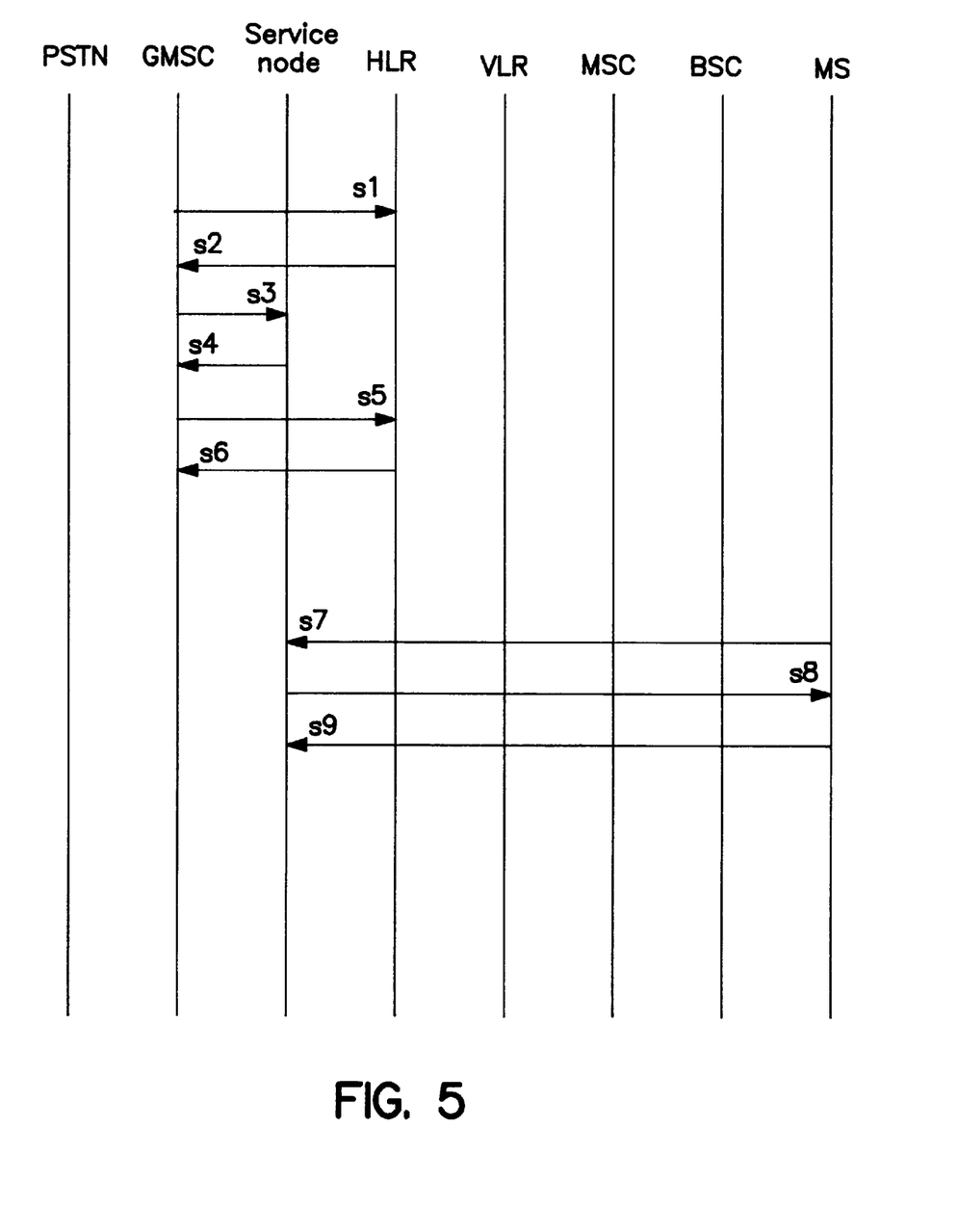
FIG. 5 is a signalling diagram which illustrates the signalling procedure followed when a call request from the A-subscriber to the B-subscriber is rejected by the B-subscriber.

FIG. 5 is a signalling diagram which illustrates signalling when connecting-up a call request from the A-subscriber to the B-subscriber, this call request being rejected by the B-subscriber. That part of the signalling procedure resulting in setting up the first connection from the A-subscriber to the gateway mobile switching centre GMSC takes place in accordance with known techniques and will not therefore be described in detail in this context. The signals s1–s6 are then sent in the manner explained with reference to FIG. 3. The signal s6 includes information concerning the routing number DNR, wherein signalling for the continued establishment of the second connection from the gateway mobile switching centre GMSC to the B-subscriber is effected in accordance with known techniques in dependence on the routing number DNR. As the B-subscriber lifts the receiver, the signals s7–s8 are sent as explained with reference to FIG. 3. When the switching unit SSP receives the signal s9, continued handling of the call request, i.e. the continued signalling, takes place in accordance with the control information contained in the service instruction 305. For instance, this signalling may be signalling for storing the A-number in the memory and releasing the A- and B-subscribers.

The control unit will store the A-number in the memory 304, provided that sufficient memory space is available in the memory 304 and provided that the A-number has been transferred. The switching unit is then ordered to send to the A-subscriber a message to the effect that the B-subscriber cannot be reached at that time and that the B-subscriber will call back later. The control unit then ensures that established connections on used control channels are released in accordance with known techniques.

Although the service node 303 is shown as a separate node in the drawings, it will be understood that the node may also be implemented in another node in the mobile radio network, for instance in the gateway mobile switching centre GMSC, in a mobile switching centre MSC or in the home location register HLR. If the service node is implemented in another node in the mobile radio network, establishment of the first and the second connections will include internal signalling in the node in which the service node is implemented, wherewith the service node is connected. The control unit SCP, the switching unit SSP and the subscriber service means 306 may also be integrated into the form of a single unit.

The mobiles have been illustrated in the drawings as car mounted units. Obvioulsy, the invention can be applied to all types of mobile radio stations, such as cordless and portable mobile telephones and pocket telephones for instance.

The drawings show the base station controllers BSC1 and BSC2 as being separate from the base stations BS1 and BS2 respectively. In certain systems, base station controllers and base stations are implemented as a unit, although these changes have no substantial affect on the application of the inventive subscriber service.

The invention is thus not restricted to the aforedescribed and illustrated exemplifying embodiments thereof, since modifications can be made within the scope of the following claims. For instance, the inventive subscriber service is not bound to any particular standard and can therefore be used in systems according to standards such as NMT, GSM, AMPS, D-AMPS and TACS, for instance.

We claim:

1. A method of implementing a subscriber service (NN) in a telecommunications network (301) which includes a mobile radio network (302) having a gateway mobile switching centre (GMSC) and a home location register (HLR), wherein a called mobile B-subscriber (MS1) controls the call setup procedure call-by-call when a call request is made to the B-subscriber from a calling A-subscriber (A1, A2), wherein the method comprises the steps of implementing the subscriber service (NN) in a service node (303) in the mobile radio network;

establishing a first connection from the A-subscriber to the gateway mobile switching centre (GMSC) in accordance with the call request, wherein the service node (303) is connected;

enabling in a subscriber service means (306) a service instruction (305) concerning the subscriber service in the service node (303);

collecting routing information from the home location register (HLR) and delivering said information to the gateway mobile switching centre (GMSC);

establishing a second connection from the service node (303) to the B-subscriber (MS1) via the mobile radio network (302) in response to the routing information obtained from the home location register (HLR);

initiating the subscriber service (NN), wherein the B-subscriber sends from its terminal (MS1) to the service node (303) information for controlling the continued establishment of the call request from the A-subscriber to the B-subscriber; and rejecting the call request from the A-subscriber as a result the B-subscriber's initiation of the subscriber service (NN).

2. A method according to claim 1, comprising the further steps of checking the memory space of a memory (304) in the service node (303) in which a memory subscriber numbers are stored, said check revealing that the memory has available storage space;

sending from the service node (303) to the A-subscriber a response message informing the A-subscriber of the B-subscriber's use of the subscriber service (NN);

storing the subscriber number of the A-subscriber in the memory (304) of the service node (303); and releasing said first connection from the A-subscriber to the service node (303) and said second connection from the service node to the B-subscriber.

3. A method according to claim 2, wherein the B-subscriber is able to call the A-subscriber with the aid of the A-number stored in the memory (304), comprising the further steps of establishing a third connection from the B-subscriber to the service node (303) in response to a service code (s21) keyed-in by the B-subscriber on its terminal (MS1);

initiating a call-up function in the service node (303), wherein the B-subscriber delivers information (s23) from its terminal (MS1) to the service node (303);

receiving information (s23) in the service node (303), wherein the control unit (SCP) collects a stored A-number from the memory (304) in response to control information in the service instruction (305) and orders the switching unit (SSP) to present the A-number to the B-subscriber on its terminal (MS1);

delivering call setup information (s25) from the B-subscriber to the service node;

receiving the call setup information (s25) in the service node, wherein the control unit orders the switching unit to connect a call request to the A-number;

continuing the establishment of the third connection from the service node (303) to the subscriber having the stored A-number; and establishing a call connection between the B-subscriber and the subscriber having the stored A-number.

4. A method according to claim 1, comprising the further steps of interconnecting the first connection from the A-subscriber to the service node (303) and the second connection from the service node to the B-subscriber despite the rejection of the call request from the A-subscriber by the B-subscriber; and establishing a call connection between the A-subscriber and the B-subscriber.

5. A method according to claim 1, comprising the further steps of sending from the service node (303) to the A-subscriber a response message informing the A-subscriber that the B-subscriber will shortly answer the call request;

awaiting a callback signal from the B-subscriber, said signal being delivered to the service node from the terminal (MS1) of the B-subscriber;

interconnecting the first connection from the A-subscriber to the service node (303) and the second connection from the service node (303) to the B-subscriber when the interconnect signal is received in the service node; and establishing a call connection between the A-subscriber and the B-subscriber.

6. A method for activating and deactivating the subscriber service according to claim 1, comprising the steps of establishing a third connection from the B-subscriber to the service node (303) when the B-subscriber keys-in a service code (s21) on its terminal (MS1);

initiating an activation function in the service node (303), wherein the B-subscriber sends information (s23) from its terminal (MS1) to the service node (303);

receiving said information (s23) in the service node (303), and thereafter sending from the service node to the B-subscriber a message informing the B-subscriber either that the service is active or is inactive and asking the B-subscriber to key-in information as to whether the status of the service shall be changed; and keying-in information in response to the message received from the service node (303) as to whether or not the current status of the service shall be changed.

7. A method according to claim 1, comprising:

registering the B-subscriber in the home location register (HLR) as a user of subscriber services implemented in the service node (303), and also registering said subscriber in the service node as a user of the subscriber service (NN); and activating the subscriber service (NN), wherein the B-subscriber sends from its terminal (MS1) information which enables the subscriber service to be used in the event of a call request to the B-subscriber.

8. A method according to claim 1, wherein the service node (303) is implemented in the gateway mobile switching centre (GMSC).

9. A method according to claim 1, wherein the service node (303) is implemented in the mobile switching centre (MSC1, MSC2).

10. A method according to claim 1, wherein the service node (303) is implemented in the home location register (HLR)).

11. A telecommunications system (301) in which the method according to claim 1 can be implemented, wherein the telecommunications system includes a mobile radio network (302) having a subscriber service means (306), and in which telecommunications system a called mobile B-subscriber has means for controlling a call request from a calling A-subscriber, wherein the mobile radio network (302) includes a service node (303) which includes a control unit (SCP), a switching unit (SSP) and said subscriber service means (306), wherein the subscriber service means (306) includes a service instruction means (305) in which control instructions for the handling of the call request are stored;

a home location register (HLR) in which the B-subscriber is registered as a user of subscriber services in the service node (303); and a gateway mobile switching centre (GMSC) which includes means for establishing a first connection from the A-subscriber to the service node (303), and a second connection from the service node to the B-subscriber in the event of a call request from the A-subscriber to the B-subscriber, wherein said call request control means functions to reject the call request from the A-subscriber to the B-subscriber in response to an initiation from the B-subscriber when the B-subscriber receives the call request.

12. A telecommunications system according to claim 11, wherein said call request control means function to store the A-number of the A-subscriber in a memory (304) in the subscriber service means (306) and to release said first and said second connections when the B-subscriber rejects the call request.

13. The telecommunications system of claim 11, wherein the initiation from the B-subscriber causes the rejection of the call request from the A-subscriber to the B-subscriber to be temporary, a call connection between the A-subscriber and the B-subscriber is established after a predetermined time period has elapsed, the predetermined time period commences at the rejection of the call request, and the A-subscriber is not released during the predetermined time period.

14. A method of implementing a subscriber service (NN) in a telecommunications network (301) which includes a mobile radio network (302) having a gateway mobile switching centre (GMSC) and a home location register (HLR), wherein a called mobile B-subscriber (MS1) controls the call setup procedure call-by-call in the event of a call request from a calling A-subscriber (A1, A2) to the B-subscriber, said method comprising implementing the subscriber service (NN) in a service node (303) in the mobile radio network;

establishing a first connection from the A-subscriber to the gateway mobile switching centre (GMSC) in accordance with said call request;

continuing the establishment of said first connection to the service node (303);

enabling in a subscriber service means (306) a service instruction (305) concerning the subscriber service in the service node (303);

establishing a second connection from the service node (303) to the gateway mobile switching centre (GMSC) in response to information obtained from the service instruction (305);

collecting routing information from the home location register (HLR) and delivering said information to the gateway mobile switching centre (GMSC);

continuing the establishment of said second connection to the B-subscriber (MS1) via the mobile radio network in response to the routing information obtained from the home location register (HLR);

initiating the subscriber service (NN), wherein the B-subscriber sends from its terminal (MS1) to the service node (303) information for controlling the continued establishment of the call request from the A-subscriber to the B-subscriber; and rejecting the call request of the A-subscriber as a result of the B-subscriber's initiation of the subscriber service (NN).

15. A method of implementing a subscriber service (NN) in a telecommunications network (301) which includes a mobile radio network (302) having a gateway mobile switching centre (GMSC) and a home location register (HLR), wherein a called mobile B-subscriber (MS1) controls the call setup procedure call-by-call in the event of a call request from a calling A-subscriber (A1, A2) to the B-subscriber, said method comprising the steps of implementing the subscriber service (NN) in a service node (303) in the mobile radio network;

registering the B-subscriber as a user of the subscriber service (NN) in the mobile radio network (302);

establishing a first connection from the A-subscriber to the gateway mobile switching centre (GMSC) in response to said call request;

collecting routing information from the home location register (HLR) and sending said information to the gateway mobile switching centre (GMSC);

continuing the establishment of said first connection to the service node (303) in response to the routing information obtained from the home location register (HLR);

enabling in a subscriber service means (306) a service instruction (305) concerning the subscriber service in the service node (303);

establishing a second connection from the service-node (303) to the gateway mobile switching centre (GMSC) in response to information obtained from the service instruction (305);

collecting routing information from the home location register (HLR) and sending said information to the gateway mobile switching centre (GMSC);

continuing the establishment of said second connection to the B-subscriber (MS1) via the mobile radio network in response to the routing information obtained from the home location register (HLR);

initiating the subscriber service (NN), wherein the B-subscriber sends from its terminal (MS1) to the service node (303) information for controlling the continued establishment of the call connection from the A-subscriber to the B-subscriber; and rejecting the call request of the A-subscriber as a result of the B-subscriber's initiation of the subscriber service (NN).

\* \* \* \* \*